(12) United States Patent
Iwamoto

(10) Patent No.: US 8,851,384 B2
(45) Date of Patent: Oct. 7, 2014

(54) CODED FIBERS

(75) Inventor: Takashi Iwamoto, Urayasu (JP)

(73) Assignee: Empire Technology Development LLC, Wilmington, DE (US)

( * ) Notice: Subject to any disclaimer, the term of this patent is extended or adjusted under 35 U.S.C. 154(b) by 179 days.

(21) Appl. No.: 13/514,012

(22) PCT Filed: Dec. 13, 2011

(86) PCT No.: PCT/US2011/064719

§ 371 (c)(1),
(2), (4) Date: Jun. 5, 2012

(87) PCT Pub. No.: WO2013/089688

PCT Pub. Date: Jun. 20, 2013

(65) Prior Publication Data

US 2013/0146664 A1     Jun. 13, 2013

(51) Int. Cl.
*G06K 19/00*     (2006.01)

(52) U.S. Cl.
USPC ............................................ 235/487

(58) Field of Classification Search
USPC ............................................ 235/487
See application file for complete search history.

(56) References Cited

U.S. PATENT DOCUMENTS

| | | | | |
|---|---|---|---|---|
| 4,114,032 A * | 9/1978 | Brosow et al. | ............... | 235/493 |
| 2006/0180440 A1 | 8/2006 | Lewis et al. | | |

FOREIGN PATENT DOCUMENTS

JP     07-243198     9/1995

OTHER PUBLICATIONS http://www.adherenttech.com/.
http://www.toyo.co.jp/lakeshore_magnetics/probe/lake08.html.
International Search Report and Written Opinion of International Application No. PCT/US2011/064719, dated Mar. 20, 2012.
Recycling technology of carbon fiber reinforced plastic by sub-critical, supercritical fluid; http://www.google.co.jp/url?sa=t &source=web&cd=2&ved=0CB8QFjAB&url=http%3A% 2F%2Fwww.cjr.shizuoka.ac.jp%2Fdb%2Fseedsdb%2F3kankyou% 2Fkan2okajima.pdf&rct=j&q=%E8%B6%85%E8%87%A8%E7% 95%8C%E3%82%A2%E3%83%Ab%E3%82%B3%E3%83%Bc% E3%83%Ab%E3%82%92%E7%94%A8%E3%81%84%E3%81% 9FCFRP&ei=vP3cTfqpMpHyvQ0jjumoDw&usq=AFQjCNGaS 4PO0JJEGB_jblKrYQYAWQt3hkQ&siq2=IGox6J7ug7e2G2dFn ZI3pg&cad=rja.
http://www.jarc.or.jp/automobile/manage/.
Toho Tenax, metal-coated carbon fiber, http://catalog.teijin.co.jp/template.phtml?id=147&pid=4 &PHPSESSID=988662ee1c8e61e7f69f585303dceff5.
Mccombe, G.P., et al., "Development of a ferromagnetic fibre metal laminate," Composites Part A: Applied Science and Manufacturing, vol. 42, Issue 10, pp. 1380-1389 (2011).
Magnetic Measurement, Toyo Corporation. Information was available at website: http://www.toyo.co.jp/lakeshore_magnetics/probe/lake08.html; While no copy of the website as it existed on Oct. 6, 2011 is in Applicant's possession, Applicant has provided a copy of the website that was printed on May 24, 2012.

(Continued)

*Primary Examiner* — Jamara Franklin

(74) *Attorney, Agent, or Firm* — Knobbe, Martens, Olson & Bear LLP

(57) ABSTRACT

Provided herein are coded fibers. In some embodiments, informationally-encoded carbon fiber structures are provided. In some embodiments, methods of manufacturing and/or reading a coded fiber are provided.

26 Claims, 5 Drawing Sheets

(56) References Cited

OTHER PUBLICATIONS

Okajima. "Recycling technology of carbon fiber reinforced plastic by sub-critical, supercritical fluid"; http://www.cjr.shizuoka.ac.jp/db/seedsdb/3.kankyo/kan2okajima.pdf; Information was available at website: http://www.google.co.jp/url?sa=t&source=web&cd=2&ved=0CB8QFjAB&url=http%3A%2F%2Fwww.cjr.shizuoka.ac.jp%2Fdb%2Fseedsdb%2F3kankyou%2Fkan2okajima.pdf&rct=j&q=%E8%B6%85%E8%8 7%A8%E7%95%8C%E3%82%A2%E3% 83%AB%E3%82%B3%E3%83%BC%E3%83%AB%E3%82%92%E7%94%A8%E3%81%84%E3%81%9FCFRP&ei=vP3cTfqpMpHyvQ0jjumoDw&usg=AFQjCNGaS4POJJEGB_jblKrYQYAWQt3hkQ&sig2=IGox6J7ug7e2G2dFnZI3pg&cad=rja. While no copy of the website as it existed on Oct. 6, 2011, is in Applicant's possession, Applicant has provided a copy of the website that was printed on May 24, 2012.

End-of-Life Vehicle Recycling Law. http://www.jarc.or.jp/automobile/manage/; Information was available at website: http://www.jarc.or.jp/automobile/manage/; While no copy of the website as it existed on Oct. 6, 2011 is in Applicant's possession, Applicant has provided a copy of the website that was printed on May 24, 2012.

Toho Tenax, metal-coated carbon fiber, http://catalog.teijin.co.jp/template.phtml?id=147&pid=4&PHPSESSID=988662eelc8e61e7f69f585303dceff5; Information was available at website: http://catalog.teijin.co.jp/template.phtml?id=147&pid=4&PHPSESSID=988662eelc8e61e7f69f585303dceff5. While no copy of the website as it existed on Oct. 6, 2011 is in Applicant's possession, Applicant has provided a copy of the website that was printed on Mar. 28, 2012.

\* cited by examiner

CODED FIBERS

CLAIM FOR PRIORITY

This application is the U.S. national phase entry under 35 U.S.C. §371 of PCT/US2011/064719, filed Dec. 13, 2011, the entire disclosure of which is hereby incorporated by reference herein.

TECHNICAL FIELD

Some embodiments presented herein generally relate to coded fibers and their use.

SUMMARY

In some embodiments, coded fibers are provided. In some embodiments, these coded carbon fibers can be used to provide information encoding carbon fiber structures. In some embodiments, methods of manufacturing a coded fiber are provided. In some embodiments, methods of reading a coded fiber are provided.

In some embodiments, a coded fiber is provided. The coded fiber can include a first magnetic carbon fiber including a first carbon fiber and at least a partial first coating of a ferromagnetic material on a surface of the first carbon fiber. In some embodiments, the first coating of ferromagnetic material provides at least a portion of a recognition pattern. In some embodiments, the magnetic material can be replaced by other identifying materials.

In some embodiments, an informationally-encoded carbon fiber structure is provided. The structure can include a first magnetic carbon fiber including a first carbon fiber and at least a partial coating of a ferromagnetic material on a surface of the first carbon fiber. The structure can also include at least one background fiber (e.g., a fiber that is not detectable in the same manner that the ferromagnetic marker is detectable), which can be a non-magnetic carbon fiber. In some embodiments, the first magnetic carbon fiber is arranged in a recognition pattern with the at least one background carbon fiber and combined with a polymer to produce a carbon fiber reinforced polymer.

In some embodiments, a method of manufacturing a coded fiber is provided. In some embodiments, the method includes providing a first magnetic carbon fiber that can include a first carbon fiber and at least a partial coating of a ferromagnetic material on a surface of the first carbon fiber. In some embodiments, the method can include positioning the coating of a ferromagnetic material in a recognition pattern to manufacture a coded fiber. In some embodiments, it is the coating that is positioned directly (e.g., by its placement on the carbon fiber). In some embodiments, the coating is indirectly positioned (e.g., by moving carbon fibers that have the coating on them).

In some embodiments, a method of reading a ferromagnetic material is provided. In some embodiments, the method includes providing at least a first magnetic carbon fiber including a first carbon fiber and at least a partial coating of a ferromagnetic material on the surface of the first carbon fiber. In some embodiments, the coating includes a recognition pattern. In some embodiments, the method includes detecting the recognition pattern generated by the ferromagnetic material. In some embodiments, it is the signature of the recognition pattern that is detected. In some embodiments, the method can be applied for any other identifiable material.

In some embodiments, a kit is provided. In some embodiments, the kit can include at least one magnetic carbon fiber that can include a first carbon fiber and at least a partial coating of a ferromagnetic material on a surface of the first carbon fiber. In some embodiments, the coating of ferromagnetic material provides a recognition pattern. In some embodiments, the kit also includes an electromagnetic sensor configured to detect the recognition pattern. In some embodiments, the kit can include any other identifiable material, in place of the ferromagnetic material.

In some embodiments, a coded fiber is provided. In some embodiments, it can include a first radio frequency identification tag ("RFIDT") fiber that includes a first carbon fiber and a first RFIDT connected to the first carbon fiber. In some embodiments, the coded fiber includes a second radio frequency identification tag ("RFIDT") fiber that includes a second carbon fiber and a second RFIDT connected to the second carbon fiber. In some embodiments, the first RFIDT and second RFIDT are arranged as a recognition pattern.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
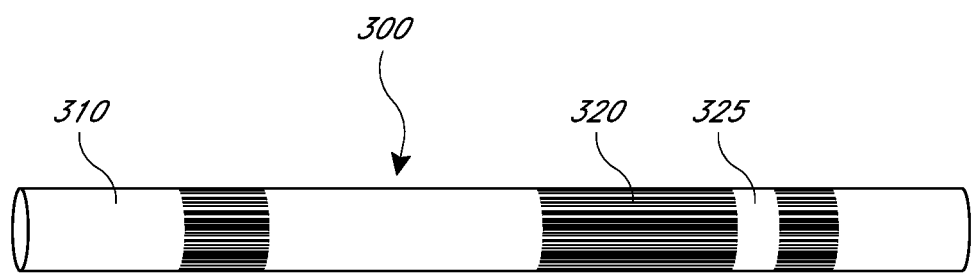
FIG. 1A is a drawing of some embodiments of a coded carbon fiber.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Carbon fiber materials are becoming increasingly common, for example, in automobiles, electronic devices, aerospace engineering, sporting equipment, and wind-power generators. It has presently been appreciated that the processing, maintenance, retirement, and recycling of carbon fiber materials can be greatly facilitated by information on the manufacturing date, process, materials, manufacturer, and/or user, among other aspects. Disclosed herein are coded carbon fibers that can, in some embodiments present specific patterns for detection (a recognition pattern) and, optionally, the subsequent identification of some aspect that is associated with the coded carbon fiber (and/or the structure that is associated with the coded carbon fiber). In some embodiments, these coded carbon fibers are at least partially coated in a magnetic material (although additional and/or alternative identifiable materials are contemplated herein as well). In other embodiments, the coded carbon fibers are fully coated in a magnetic material. In some embodiments, the magnetic material (either on the fiber itself, or as presented as an arrangement of various carbon fibers) is arranged to form a recognition pattern. In some embodiments, the coded carbon fibers can be embedded in a carbon fiber product without impairing the functionality of the product. In some embodiments, the recognition pattern can be read and/or used as an identifier to provide information about the product (e.g., manufacturing or use of a carbon fiber product); however, other uses are contemplated and disclosed herein as well.

FIG. 1A depicts some embodiments of a coded fiber 300 which can include or be part of a recognition pattern. In some embodiments, the coded fiber 300 includes a carbon fiber 310 and some type of identifiable material 320 associated with the carbon fiber. In some embodiments, the identifiable material can include a magnetic material.

In some embodiments, the magnetic material (or other identifiable material) can be on a surface of the coded fiber. In some embodiments, the magnetic material (or other identifiable material) can be part of the carbon fiber. In some embodiments, the magnetic material (or other identifiable material) can be covalently attached to the carbon fiber. In some embodiments, the magnetic material (or other identifiable material) can be within the carbon fiber.

In some embodiments, the coating provides at least a portion of a recognition pattern. In some embodiments, the recognition pattern can be on a single fiber (e.g., an entire recognition pattern can be on a single fiber). In some embodiments, the recognition pattern can be made up of two or more fibers, and the magnetic material can be positioned on the two or more fibers. In some embodiments (as described in more detail below), the recognition pattern can be a two dimensional arrangement, such as a barcode, where separate fibers can make up one or more of the bars of information of a recognition pattern.

As noted below, a variety of materials can be used to create the recognition pattern. In some embodiments, the identifiable material can include a magnetic material. In some embodiments, the magnetic material includes an inducible magnetic material. In some embodiments, at least a portion of the coded fiber is magnetized to provide at least a portion of a recognition pattern. In some embodiments, the magnetic material includes a ferromagnetic material. In some embodiments, the coating of magnetic material includes at least one of iron, nickel, or cobalt.

As used herein, the term "coating" can denote a partial coating and/or a full coating, unless specifically noted otherwise. In some embodiments, the coating can involve covalent bonds to the fiber and/or nanotube.

In some embodiments, a first and a second coded fiber are provided and together make up the recognition pattern. In some embodiments, at least a portion of the first and second coded fibers are magnetic, thereby providing at least a portion of the recognition pattern. In some embodiments, the recognition pattern includes at least about 2, 3, 5, 10, 20, 30, 40, 50, 60, 70, 80, 90, 100, 200, 300, 400, 500, 600, 700, 800, 900, 1,000, 10,000, 100,000, or 1 million coded fibers, including a range above any one of the preceding values and a range between any two of the preceding values. In some embodiments, each additional coded fiber is at least partially coated by the magnetic material (or other identifiable material), thereby providing at least a further portion of the recognition pattern.

Figure 1B:
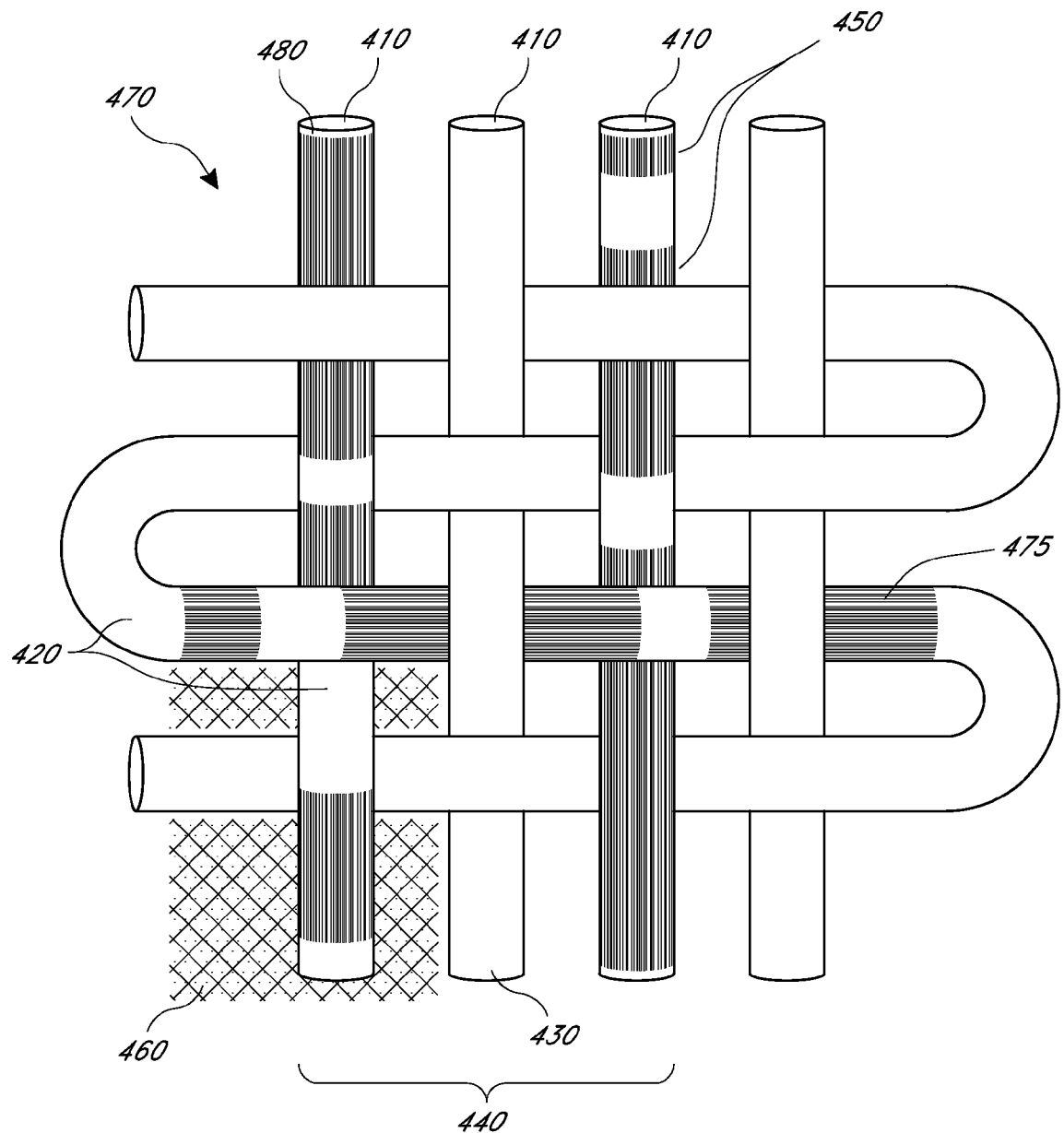
FIG. 1B is a drawing of some embodiments of a coded carbon fiber.

In some embodiments, the first coded fiber and the second coded fiber are arranged relative to each other (FIG. 1B). In some embodiments, the two dimensional placement and/or arrangement of the fibers allows for more informational content to be associated with the pattern and/or more uniqueness to be available for each pattern. In some embodiments, each additional coded fiber (for example, the third, fifth, tenth, or hundredth) is arranged relative to the first coded fiber and/or second coded fiber. In some embodiments, the arrangement is substantially parallel on substantially the same plane 410. In some embodiments, the arrangement is substantially non-parallel on substantially the same plane 420. For example, a non-parallel arrangement can be substantially perpendicular. For example, a non-parallel arrangement can include intersecting fibers that intersect at an angle that is not 90 degrees. In some embodiments, at least two coded fibers are arranged in parallel, and at least one additional coded fiber is arranged perpendicular to the at least two others. In some embodiments, at least two coded fibers are arranged in parallel, and at least one additional coded fiber intersects the at least two others at an angle that is not 90 degrees to the parallel structure. In some embodiments, the arrangement is in substantially the same plane. In some embodiments, the arrangement is in substantially different planes. In some embodiments, at least two coded fibers are arranged in the same plane, and at least one additional coded fiber is arranged in a different plane than the others.

In some embodiments, the second magnetic fiber includes a second carbon that is at least partially coated in a second coating of magnetic material (or other identifiable material). In some embodiments, the second coating is the same material as the first coating. In some embodiments, the second coating is a different material than the first coating. In some embodiments, the second coating is a ferromagnetic material. In some embodiments, the second coating provides at least a further portion of the recognition pattern. In some embodiments, the amount of the magnetic material (or other identifiable material) can vary on different carbon fibers and/or sections of a single fiber.

In some embodiments, all or substantially all of the fibers in a recognition pattern include at least some coating of an identifiable material, such as a magnetic material. In some embodiments, only a subset of the fibers in a recognition pattern include a coating, e.g., less than about 99, 98, 97, 96, 95, 90, 85, 80, 75, 70, 65, 60, 55, 50, 45, 40, 35, 30, 25, 20, 15, 10, 9, 8, 7, 6, 5, 4, 3, 2, 1, 0.1%, or less include a coating of an identifiable material. In some embodiments, the recognition pattern includes at least one background fiber 430. The term "background" denotes that the fiber or material is not detectable in the same manner that the "identifiable material" is detectable. Thus, when the identifiable material includes a magnetic material, then a suitable background can be a non-magnetic material. In some embodiments, the recognition pattern further includes at least about 2, 3, 5, 10, 100, 1,000, 10,000, or 1,000,000 background fibers, including ranges above any one of the preceding values and any ranges between any two of the preceding values. In some embodiments, the background carbon fiber or fibers include a further portion of the recognition pattern. In some embodiments, the background carbon fiber or fibers in conjunction with the coded fiber make up at least a portion of the recognition pattern. In some embodiments, the background carbon fiber or fibers, in conjunction with the coded fiber of fibers make up the entire recognition pattern.

Figure 1C:
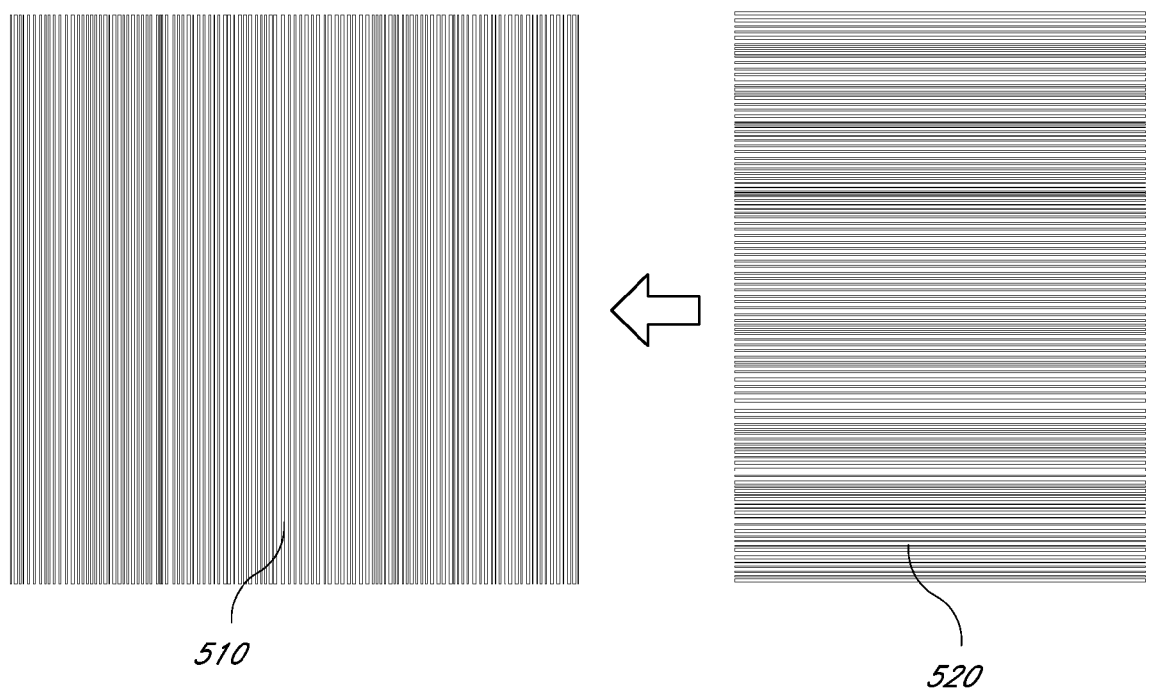
FIG. 1C is a drawing of some embodiments of a coded carbon fiber.

In some embodiments, the recognition pattern includes a pattern that can be determined by direct or indirect detection. In some embodiments, the pattern is one-dimensional. In some embodiments, the pattern is two-dimensional. In some embodiments, a one-dimensional pattern can be provided by a single magnetic coating on one carbon fiber (e.g., FIG. 1A). In some embodiments, a one-dimensional pattern can be formed by alternating coated and non-coated segments on different fibers, and having the fibers themselves arranged so as to provide the pattern (e.g., such as a barcode, in FIG. 1C). While such a pattern is, as a practical matter, a two-dimensional structure, it will be appreciated that the pattern itself, and its reading, can be independent of the height of the bars (e.g., in a barcode) and thus, can be characterized as a one-dimensional pattern.

In some embodiments, as shown in FIG. 1B, a two-dimensional pattern can be provided by at least two parallel coded fibers 450 and 480, in which the coded fibers contain coatings at different portions of the fibers. In some embodiments, a two-dimensional pattern can be provided by a single coated fiber, such as when a single coated fiber is bent 475, thereby providing a magnetic pattern in two dimensions. In some embodiments, a two-dimensional pattern can be provided by arranging different fibers at different angles relative to one another. For example, as shown in FIG. 1B, a first coded fiber 480 can be positioned at an angle relative to another coded fiber 420, thereby providing a magnetic (or other identifiable marker) pattern in two dimensions. In some embodiments, the angle can be somewhere between parallel and perpendicular, e.g., about 0, 1, 5, 10, 15, 20, 25, 30, 35, 40, 45, 50, 55, 60, 65, 70, 75, 80, 85, or 90 degrees relative to one another. In some embodiments, when there is an orientation to the fibers (e.g., one end is different from the other end), the angles can be greater than 90 degrees, e.g., about 95, 100, 105, 110, 115, 120, 125, 130, 135, 140, 145, 150, 155, 160, 165, 170, 175, 180, 185, 190, 195, 200, 210, 215, 220, 225, 230, 235, 240, 245, 250, 255, 265, 270, 275, 280, 285, 290, 295, 300, 305, 310, 315, 320, 325, 330, 335, 340, 345, 350, 355, or close to 360 degrees, including any range between any two of the preceding values. In some embodiments, the pattern is three-dimensional, and the same concepts applied to the two-dimensional applications can be applied in a third dimension, providing yet greater distinguishing power and uniqueness to various recognition patterns. In some embodiments, using varying amounts of an identifiable marker adds further distinguishing power, and thus, different fibers can have different amounts of identifiable marker in some embodiments. In some embodiments, using varying types of identifiable markers adds further distinguishing power, and thus, different fibers can have different types of identifiable marker in some embodiments.

In some embodiments, one or more of the coded fibers is embedded in a polymer. In some embodiments, at least one background fiber is also embedded in the polymer. In some embodiments, the polymer is any polymer that does not interfere unduly with the identifiable material. In some embodiments, the polymer can be one or more of an epoxy, a polyester, a vinyl ester, and/or a nylon.

In some embodiments, the coded fiber includes at least one filament of carbon atoms aligned substantially parallel with an axis of the filament. In some embodiments, additional coded fibers also include such filaments. In some embodiments, the filament is part of a nanotube. In some embodiments, the coded fiber includes a carbon nanotube. In some embodiments, background fibers also include similar filaments. In some embodiments, the background fiber can include a carbon nanotube. In some embodiments, two or more coded filaments include a combination of filament of carbon atoms aligned substantially parallel with an axis of the filament and carbon nanotubes. In some embodiments, two or more background filaments include a combination of filament of carbon atoms aligned substantially parallel with an axis of the filament and carbon nanotubes.

In some embodiments, the coded fiber is part of a weave of carbon fibers (see, e.g., FIG. 1B). In some embodiments, the weave includes at least one coded carbon fiber 480 and one non-coded carbon fiber 430. In some embodiments, the coded fiber is a weft 475 of the weave. In some embodiments, the coded carbon fiber is a warp 480 of the weave. In some embodiments, at least one coded carbon fiber is a weft, and at least one coded fiber is a warp. In some embodiments, the carbon fiber weave is prepared by weaving weft, solely made of carbon fibers, with warp, in which portions other than the coded carbon fibers are background carbon fibers. In some embodiments, carbon fibers fully coated in a magnetic material can be alternately woven with background carbon fibers, thereby forming a 1-dimensional pattern (e.g., similar to a barcode).

In some embodiments, a three-dimensional recognition pattern is provided. While this can be achieved in a variety of ways (e.g., any manner in which carbon nanostructures are made), in some embodiments this can be done by combining planes of various fiber structures. In some embodiments, a first plane of carbon fibers includes at least a first magnetic carbon fiber, and a second plane of carbon fibers contains at least a second magnetic carbon fiber. In some embodiments, a plane of carbon fibers including at least a portion of a recognition pattern can be stacked with at least one other plane of carbon fibers. In some embodiments, one or more planes of carbon fibers, e.g., 2, 3, 4, 5, 10, 25, 50, 75, or 100 planes of carbon fibers are stacked. In some embodiments, at least a second plane of carbon fiber includes a portion of a recognition pattern. In some embodiments, two or more planes of carbon fiber each contain at least one magnetic fiber (or other identifiable fiber). In some embodiments, two or more adjacent planes each contain at least one magnetic fiber (or other identifiable fiber). In some embodiments, at least one background plane lies between two coded planes, and each of the two coded planes contains at least one coded fiber. In some embodiments, at least one carbon fiber plane is a woven fabric. In some embodiments, each plane of carbon fibers is contacted with a polymer, for example an epoxy or other substance to assist in keeping the positions of the planes consistent with one another.

While the recognition patterns created by the coded fibers can be used in a variety of ways and with a variety of devices, in some embodiments, the coded fibers can be used in combination with a carbon fiber reinforced polymer. In some embodiments at least one magnetic (or other identifiable) fiber is arranged so as to provide a recognition pattern on a carbon fiber reinforced polymer. In some embodiments, the recognition pattern on the carbon fiber polymer can be used as an identifier, for example for facilitating the processing and/or recycling of that carbon fiber polymer. In some embodiments, the recognition pattern can also be used for bar-code type purposes.

In some embodiments, an informationally-encoded carbon fiber structure is provided. In some embodiments, the informationally-encoded carbon fiber structure includes a first identifiable (e.g., magnetic) fiber, and at least a background (e.g., non-magnetic) carbon fiber arranged in at least a partial recognition pattern. In some embodiments, the first identifiable fiber includes a first carbon fiber and at least a partial coating of a magnetic material on the surface of the first fiber.

In some embodiments, an informationally-encoded carbon fiber structure is provided, in which an identifiable (e.g., magnetic) carbon fiber is adjacent to a background carbon fiber polymer.

In some embodiments, an informationally-encoded carbon fiber structure also includes a second (or greater) identifiable (e.g., magnetic) carbon fiber in an arrangement with the first identifiable (e.g., magnetic) carbon fiber. In some embodiments, the structure includes an arrangement of about 1, 2, 3, 4, 5, 10, 25, 50, 75, 100, 500, 1,000, or 1,000,000 identifiable (e.g., magnetic) carbon fibers, including a range below any one of the preceding values, a range above any one of the preceding values and any range between any two of the preceding values. In some embodiments, the arrangement is parallel. In some embodiments, the arrangement is parallel on substantially the same plane. In some embodiments, the arrangement is non-parallel. In some embodiments, the arrangement is non-parallel on substantially the same plane. In some embodiments, a non-parallel arrangement can include two perpendicular magnetic carbon fibers. In some embodiments, a non-parallel arrangement can include intersecting magnetic fibers that intersect at an angle that is not 90 degrees. In some embodiments, at least two magnetic carbon fibers are arranged in parallel, and at least one additional magnetic carbon fiber is arranged perpendicular to the at least two others. In some embodiments, at least two magnetic carbon fibers are arranged in parallel, and at least one additional magnetic carbon fiber intersects the at least two others at an angle that is other than 90 degrees. In some embodiments, the first and second magnetic carbon fibers are arranged to form a woven fabric. In some embodiments, the woven fabric includes at least one background fiber. In some embodiments, the carbon fiber of the informationally-encoded carbon fiber structure includes a carbon nanotube. Any of the embodiments of the coded fiber and/or recognition pattern can be employed in the informationally-encoded structure.

In some embodiments, the informationally-encoded carbon fiber structure is part of a carbon fiber-reinforced polymer sheet. In some embodiments, the informationally-encoded carbon fiber structure is part of a vehicle. In some embodiments, the informationally-encoded carbon fiber structure is part of: an automobile, an airplane, a bike frame, a composite material, a remote control vehicle, a sailboat, a motorcycle, a laptop, a tripod, a fishing rod, archery equipment, a tent pole, a racquet frame, a golf club, a billiard cue, or a fabric. In some embodiments, the automobile is hybrid-electric. In some embodiments, the automobile is electric.

In some embodiments, the informationally-encoded carbon fiber structure includes a polymer, such as at least one of: an epoxy, a polyester, a vinyl ester, and/or a nylon. In some embodiments, the informationally-encoded carbon fiber structure includes at least one of para-aramid synthetic fiber, aluminum, and/or glass.

In some embodiments, a method is provided for manufacturing a coded fiber. In some embodiments, a surface of at least one carbon fiber is at least partially coated with an identifiable material (such as a magnetic material), and the identifiable material is positioned in a particular arrangement, thereby forming a recognition pattern. In some embodiments, at least one identifiable material carbon fiber and at least one background material carbon fiber are positioned in a recognition pattern. In some embodiments, the at least one identifiable material (e.g. magnetic) carbon fiber and at least one background material (e.g. non-magnetic) carbon fiber are contacted with a polymer, thereby forming a carbon fiber reinforced polymer. In some embodiments, the magnetic material is a ferromagnetic material. In some embodiments, the ferromagnetic material includes at least one of nickel, cobalt, or iron.

In some embodiments, the method includes positioning at least one background carbon fiber in proximity to the identifiable material carbon fiber to provide at least a part of the recognition pattern. In some embodiments the proximity between the first identifiable material fiber and at least one inert fiber is about 1, 2, 3, 4, 5, 10, 25, 50, 75, 100, 500, 1000, 10,000, or 100,000 micrometers, including a range below any one of the preceding values, a range above any one of the preceding values and a range between any two of the preceding values.

In some embodiments, at least one magnetic carbon fiber and at least one background fiber are contacted with an epoxy to form an epoxy composition. In some embodiments, the magnetic carbon fiber or fibers and the non-magnetic fiber or fibers are arranged in an arrangement to provide at least part of a recognition pattern. In some embodiments, the recognition pattern is one-dimensional, and thus can involve the application of the identifiable material along a single direction (e.g., along a single fiber) or in a barcode type arrangement. In some embodiments, the recognition pattern is two-dimensional, and can involve the relative placement of two or more fibers. In some embodiments, the recognition pattern is three-dimensional, and can involve the relative placement of three or more fibers.

In some embodiments, the pattern that is created is a desired pattern. In some embodiments, the fibers can be placed in a desired pattern. In some embodiments, the pattern that is created is random, partially random, or randomly created. Thus, in some embodiments, the various fibers (including identifiable and background fibers) can be mixed together in an epoxy and the epoxy allowed to dry. Following this, a signature can be observed from the dried epoxy composite (from the random arrangement of identifiable fibers and background fibers) and the signature can be paired with that particular dried composite. In some embodiments, the mixing and/or combining process need not be completely random or completely ordered and can include a mix of the two approaches and/or a bias to either of the approaches.

In some embodiments, the recognition pattern is created by the arrangement of the identifiable fibers optionally with the background fibers. Thus, at least some of the fibers already have the identifiable material on them prior to being positioned (and optionally prior to addition of the polymer).

In some embodiments, the recognition pattern is created after the positioning of the fibers. Thus, in some embodiments, the fibers can be physically arranged and then the identifiable material can be applied to the fibers (either before or after administration of some of the polymer). In some embodiments, at least one of the fibers become coated with the identifiable material (e.g., about 1, 5, 10, 15, 20, 30, 40, 50, 60, 70, 80, 90, 95, or 99% of the fibers) to at least some extent (e.g., about 0.001, 0.01, 0.1, 1, 5, 10, 20, 30, 40, 50, 60, 70, 80, 90, 95, 99, or 100%, including a range beneath any one of the preceding values and a range between any two of the preceding values).

In some embodiments, the resulting arrangement includes a woven carbon fiber fabric. In some embodiments, the arrangement is impregnated with epoxy resin.

In some embodiments, a carbon fiber reinforced polymer is prepared by dispersing chopped fibers that include an indentifiable marker in thermoplastic resin.

In some embodiments, the polymer combination can then be hardened and/or cured. In some embodiments, the polymer combination is hardened to the B stage. In some embodiments, the polymer combination is molded. In some embodiments, the polymer combination is molded to a desired shape. In some embodiments, the polymer combination is molded by any commonly used method of molding, for example vacuum molding.

In some embodiments, a carbon fiber-reinforced polymer is formed using a method for manufacturing a standard carbon fiber-reinforced polymer used for applications requiring high-strength, the method can include layering 2-dimensional carbon fiber fabrics oriented at different angles in a stack, impregnating the fabrics with epoxy resin, followed by hardening.

In some embodiments, two or more coded fibers are at least partially embedded in a polymer or other fixative so as to allow spatial positioning of the coded fiber to be maintained. In some embodiments, the polymer is a same polymer as a product onto which the recognition pattern is to be attached or included.

In some embodiments, a carbon fiber reinforced polymer is prepared by weaving at least one carbon fiber whose surface is at least partially coated with an identifiable material (such as a magnetic material), alternately with at least one background carbon fiber, thereby forming at least one layer of carbon fabric to be reinforced. In some embodiments, the at least one layer of carbon fabric is used as a reinforced material to form pre-pregs, followed by molding and hardening.

In some embodiments, two or more planes of carbon fiber are stacked during their manufacture. In some embodiments, each of the two or more planes of carbon fiber includes a woven carbon fiber fabric. In some embodiments, the two or more planes are oriented at different angles (for example, as described in reference to two or more identifiable fibers). In some embodiments, the two or more planes can then be impregnated with epoxy resin. In some embodiments, the epoxy can be hardened. In some embodiments, the hardening is to the B stage. In some embodiments, the two or more planes are molded to a desired shape. In some embodiments, molding is by any commonly used method, for example vacuum molding. In some embodiments, the two or more planes include at least a first plane that includes at least one identifiable marker on a carbon fiber, and at least a second plane that does not include the identifiable marker. In some embodiments, the two or more planes include at least a first plane that includes at least one identifiable marker fiber, and at least a second plane that includes at least one identifiable marker fiber. In some embodiments, a first magnetic plane and a second magnetic plane are layered on top of each other. In some embodiments, a first magnetic plane and a second magnetic plane are separated by at least one non-identifiable marker plane, for example about 1, 2, 3, 5, 10, 100, 1,000, 10,000, or 100,000 background planes.

In some embodiments, the first carbon fiber is positioned, and then at least a partial magnetic coating is applied, thereby forming a recognition pattern. In some embodiments, a magnetic coating is applied to the first carbon fiber (and/or other fibers), and then the first carbon fiber (and/or other fibers) is positioned. In some embodiments, the first carbon fiber is positioned, and then at least a partial magnetic coating is applied to the first carbon fiber and to at least a second carbon fiber (and/or other fibers).

In some embodiments, the resulting recognition pattern formed is then recorded or captured as a digital representation of the signature of the recognition pattern in a database. As will be appreciated by those of skill in the art, the recognition pattern, and the characteristics of the recognition pattern that are observed and/or detected, can differ depending upon a number of aspects (e.g. environmental conditions, placement of the pattern, depth of the pattern, sensitivity of the detector, speed of detection, distance of detection, etc.) As such, for the sake of clarity, the phrase "signature of the recognition pattern" or "recognition pattern signature" can be used to clarify that it is the detectable aspects that are being recorded, compared, etc. However, the term "recognition pattern" can be used to denote either the physical pattern itself and/or the signature, depending upon the context of it usage. In some embodiments, the digital representation of the signature is stored on a computer-readable medium. In some embodiments, the recognition pattern is observed (e.g., detected via a device that can resolve the placement of the identifiable material), and the data representing the signature of the recognition pattern is stored and to be associated with the recognition pattern and/or the rest of the device and/or material associated with the recognition pattern. In some embodiments, this is especially useful, when, for example, the initial placement of the fibers is nonspecific and/or random. In some embodiments, the synthesis of the recognition pattern allows one to predict the signature of the recognition pattern (e.g., when the coded fibers are placed in specific places relative to each other or weaved into a specific pattern). In some embodiments, no observation or detection of the recognition pattern is required in order to identify the signature, and instead it can be predicted based upon manufacturing approaches. In such embodiments, a digital representation of the signature can be predicted and/or prepared by a computer configured to predict how aspects of the identifiable material will exhibit themselves when arranged in a given manner.

In some embodiments, pre-pregs are formed. In some embodiments, the pre-pregs are formed on at least one layer of a carbon fabric.

As noted above, while the recognition pattern is the actual pattern that is formed for subsequent observation, the signature need not be identical in every respect to the physical structure of the recognition pattern, and is instead related to those aspects of the recognition pattern that are detected (rather than those aspects that are absolutely present). Thus, in some embodiments, rather than (and/or in addition to) storing and recording and/or matching information regarding the actual recognition pattern, one can also do this with the signature of the recognition pattern, in particular, the pattern detected by the device used to detect the identifiable material on the fibers. In some embodiments, there is a range of signatures that can be associated with any given recognition pattern, and all, a subset of, or variations and hybrids thereof can be included in the database. Thus, in some embodiments, an absolute match to a signature is not required, but an approximate match is adequate. Thus, in some embodiments, the match can be less than 100%, e.g., about 99, 98, 97, 96, 95, 94, 93, 92, 91, 90, 85, 80, 75, 70, 65, 60, 50, 40, 30, 20, 10, 1 or lower, (including any range less than any of the preceding values), depending upon the particular application, arrangement, and use.

Figure 2A:
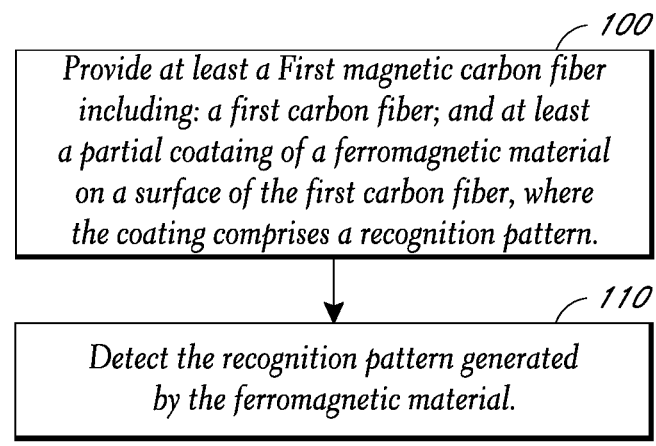
FIG. 2A is a flow chart depicting some embodiments of methods of using a coded carbon fiber.

In some embodiments, a method of reading a ferromagnetic material is provided (FIG. 2A). In some embodiments, the method includes providing at least a first magnetic carbon fiber, the first magnetic carbon fiber including a fiber (e.g., a carbon fiber) at least partially coated in magnetic material that thereby forms a recognition pattern 100. In some embodiments, the method includes detecting and/or identifying the recognition pattern generated by the magnetic material 110. In some embodiments, one detects the signature of the recognition pattern that is generated by the identifiable material of the recognition pattern.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the recognition pattern and/or coded fiber can be any of the recognition patterns described herein.

In some embodiments, e.g., when the identifiable material includes a magnetic material, the recognition pattern can be detected by an electromagnetic detection device. In some embodiments, the electromagnetic detection device is configured to resolve a magnetic material within about 1 nanometer, 2 nanometers, 5 nanometers, 10 nanometers, 100 nanometers, 1 micron, 10 microns, 100 microns, 1 millimeter, 10 millimeters, 100 millimeters, or more, including a range below any one of the preceding values, a range above any one of the preceding values and any range between any two of the preceding values. In some embodiments, the electromagnetic device is a giant magnetoresistance ("GMR") sensor, and, in some embodiments, the GMR sensor has sufficient resolution for detecting the code at the level of single fibers. In some embodiments, the electromagnetic device is a superconducting quantum interference device ("SQUID") sensor, and the SQUID sensor has sufficient resolution for detecting the recognition pattern at the level of single fibers or greater, and/or spacing of the detectable material along a fiber.

In some embodiments, a magnetic probe can be used to read a recognition pattern on a relatively rough scale. In some embodiments, a magnetic sensor reads the recognition pattern (or more specifically, the signature of the recognition pattern), even after the recognition pattern is incorporated in a final product. In some embodiments, the sensor can read the magnetic field (or other signal from the recognition pattern) even when the recognition pattern is part of any one or more of: a carbon fiber reinforced polymer, an automobile, an airplane, a bike frame, a composite material, a remote control vehicle, a sailboat, a motorcycle, a laptop, a tripod, a fishing rod, archery equipment, a tent pole, a racquet frame, a golf club, a billiard cue, or a fabric.

In some embodiments, a database can be provided and/or accessed before, during and/or after the scanning and/or detection of the recognition pattern (or its signature). In some embodiments, the database contains an electronic representation of at least one recognition pattern (and/or it signature) generated by the identifiable material (e.g., magnetic material). In some embodiments, the recognition pattern generated by the identifiable material is compared to an electronic representation of the recognition pattern (or its signature), which is in the database before and/or after the detection of the recognition pattern. In some embodiments, the recognition pattern generated by the magnetic material is compared to about 2, 3, 5, 10, 100, 1,000, 10,000, 100,000 or more electronic representations of recognition patterns stored in the database.

In some embodiments, the database can be created by entering known recognition patterns (or signatures thereof) and the material that the recognition patterns are associated with. In some embodiments, a collection of signatures of various recognition patterns is obtained, and the information regarding each of the materials and/or items associated with the recognition patterns is added later. Thus, the database need not include both the recognition pattern (or signatures thereof) and information about a material, prior to the database being used or accessed. In some embodiments, the information regarding the characteristics of the material can be added as one observes the properties of the material, throughout the life of the material. In some embodiments, the information regarding the signature of the recognition pattern can be defined based upon a prediction of the signature from a known and/or desired recognition pattern. In some embodiments, the information regarding the signature of the recognition pattern can be defined based upon observing and/or scanning of a recognition pattern. In some embodiments, this can be performed before the recognition pattern is placed into an object. In some embodiments, this can be performed after the recognition pattern is placed on or associated with an object.

In some embodiments, information about a coded carbon fiber (e.g., the recognition pattern and/or the fibers and/or structure associated with the recognition pattern) is provided by the database and/or stored in the database and/or sent to the database. In some embodiments, the information involves at least one of the following: manufacturing date, manufacturer identity, client user identity, manufacturing process, and/or manufacturing materials. However, no item in this list is required and other information can be present as well or instead. In some embodiments, the above information is associated with at least one electronic representation of a recognition pattern (and/or a signature of the recognition pattern), which is stored in a database. In some embodiments, when a recognition pattern generated by an identifiable material (e.g., a magnetic material) is stored in a database, the recognition pattern is associated with information about at least one manufacturing date, manufacturer identity, client user identity, manufacturing process, or manufacturing materials. For example, when the database is accessed, information about a carbon fiber material can be obtained, and this information can be used to determine how the carbon fiber material is to be recycled, dismantled, what its life expectancy is and/or other characteristics.

In some embodiments, the first coded carbon fiber is located on or in a carbon-fiber reinforced polymer material. In some embodiments, a carbon fiber reinforced polymer material contains at least one recognition pattern produced by the arrangement of at least one coded carbon fiber. In some embodiments, a carbon fiber reinforced polymer contains more than one recognition pattern, e.g., about 2, 3, 5, 10, 100, 1000, 10,000, 100,000 or more recognition patterns (and/or signatures). In some embodiments, each recognition pattern can denote a particular type of information (e.g., date made, how made, and/or how to recycle) and a recognition pattern can be added for each piece of relevant information that is desired to be associated with the device or structure.

In some embodiments, the recognition pattern denotes how the material is to be recycled. In some embodiments, the recycling is in compliance with a local requirement and/or law, for example a law demanding a strict recycling rate, e.g., 95% or higher in e.g., vehicles. In some embodiments, recycling is facilitated by managing the material through its entire life cycle. In some embodiments, the type of recycling is selected from at least one of heat decomposition, low-temperature fluid treatment, high-temperature fluid treatment, and/or involving supercritical alcohol.

In some embodiments, a material can be processed based on the recognition pattern that is detected and/or the information associated with that recognition pattern (or its signature) in a database. For example, based upon the recognition pattern on a material, that material can undergo an inspection, undergo maintenance, be taken out of service, re-used in a different product or manufacture, and/or recycled.

Figure 2B:
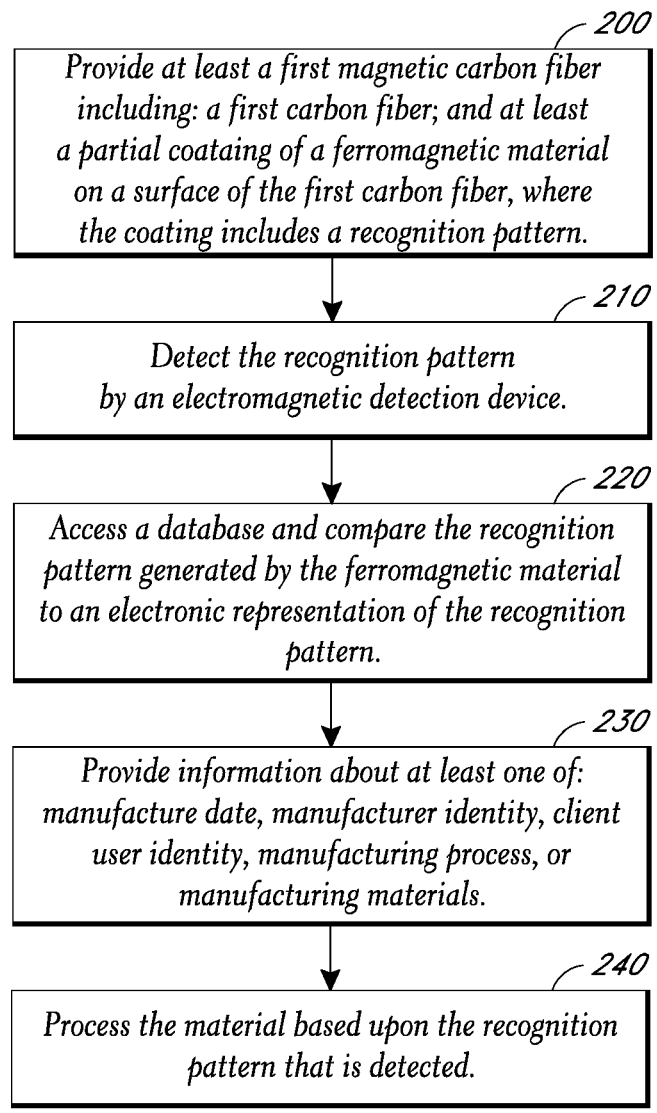
FIG. 2B is a flow chart depicting some embodiments of methods of using a coded carbon fiber.
Figure 2A:
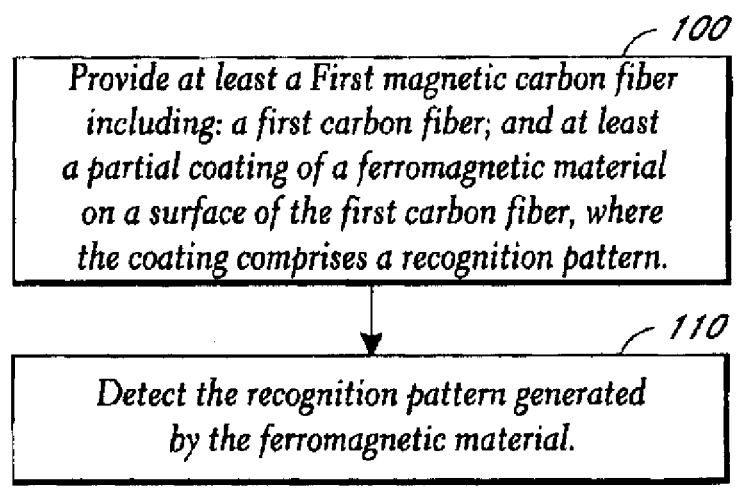
Figure 2B:
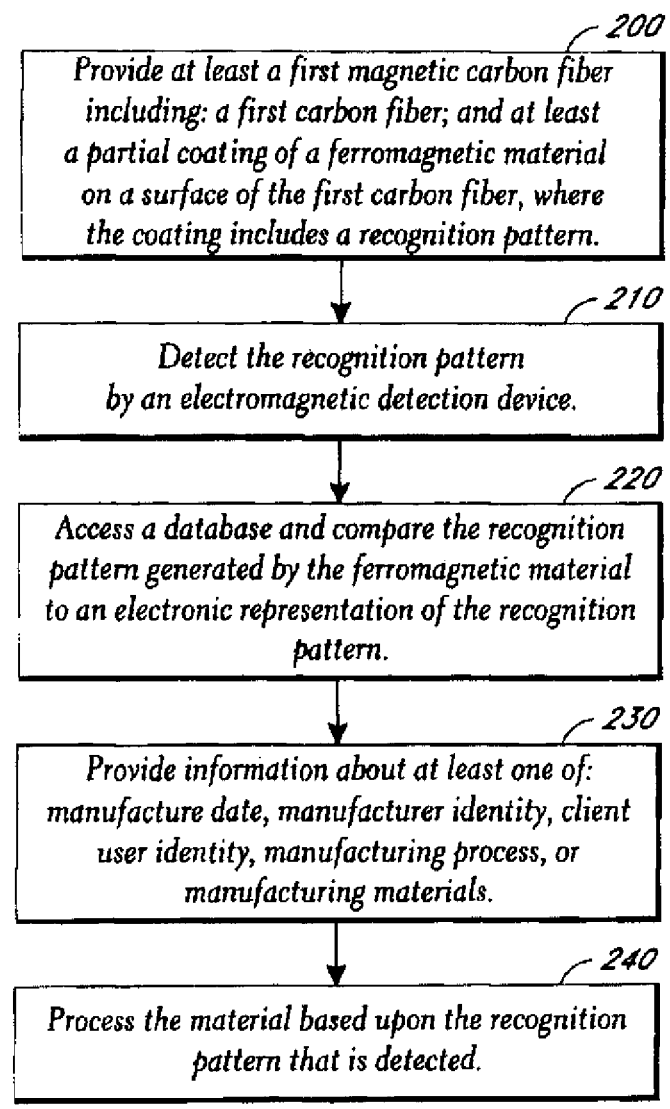

FIG. 2B depicts some embodiments involving the use of a recognition pattern. In some embodiments, the method includes providing at least a first magnetic carbon fiber. The carbon fiber can include a first carbon fiber and at least a partial coating of a magnetic material on the surface of the carbon fiber, and thereby at least include a recognition pattern (block 200) (FIG. 2B). In some embodiments, the method includes detecting the recognition pattern (block 210) and/or at least the signature of the recognition pattern. In some embodiments, the identifiable material includes a magnetic material, and thus, the recognition pattern signature can include aspects relating to a magnetic field. In some embodiments, detecting the recognition pattern (and/or its signature) can be achieved by the use of an electromagnetic device (block 210). In some embodiments, a database can be accessed, and the data describing the signature of the recognition pattern generated by the magnetic material can be compared to an electronic representation of the signature of the recognition pattern (block 220). In some embodiments, information is associated with the electronic representation of the signature of the recognition pattern that is stored in the database, and this information can be provided. In some embodiments, the information can involve at least one of: manufacture date, manufacturer identity, client user identity, manufacturing process, or manufacturing materials (block 230). In some embodiments, the material that is associated with the recognition pattern is processed based upon the recognition pattern that is detected (block 240). In some embodiments, this can result in recycling the carbon fiber in a particular manner.

In some embodiments, kits are provided. In some embodiments, the kit includes at least one at least one fiber (which can be a carbon fiber) that has at least a partial coating of an identifiable material on its surface (e.g., a magnetic material). In some embodiments, there is an adequate pattern established on the fiber, such that a recognition pattern is already provided; however, this need not be the situation in all embodiments. In some embodiments, the identifiable material is any described herein. In some embodiments, the kit includes more than one identifiable carbon fiber. For example, the kit can include about 2, 3, 5, 10, 100, 1,000, 10,000, 100,000 or more magnetic carbon fibers, in which each magnetic carbon fiber is partially or fully coated in a magnetic material. In some embodiments, the kit includes one or more recognition patterns. In some embodiments, the kit includes a curable polymer, such as an epoxy.

In some embodiments, the kit includes an electromagnetic sensor. In some embodiments, the electromagnetic sensor includes a giant magnetoresistance ("GMR") sensor. In some embodiments, the electromagnetic sensor is a superconducting quantum interference device sensor. In some embodiments, the electromagnetic sensor is configured to resolve a magnetic material within about 1 nanometer, 2 nanometers, 5 nanometers, 10 nanometers, 100 nanometers, 1 micron, 10 microns, 100 microns, 1 millimeter, 10 millimeters, 100 millimeters, 1000 millimeters, or more, including a range below a one of the preceding values, a range above any one of the preceding values and any range between any two of the preceding values.

In some embodiments, the kit includes a computer readable medium. In some embodiments, the computer readable medium is operationally connected to the electromagnetic sensor, and the computer readable medium includes a database including informational content regarding one or more recognition patterns (and/or their signatures). In some embodiments, information is associated with at least one of the one or more recognition patterns (and/or their signatures).

In some embodiments, the information can include manufacture date, manufacturer identity, client user identity, manufacturing process, and/or manufacturing materials.

In some embodiments, a coded fiber with a radio frequency identification tag ("RFIDT") is provided. In some embodiments, this can be the same as any of the magnetic embodiments provided herein, except that the identifiable material includes a radio frequency based material, instead of a magnetic material. Thus, all embodiments provided herein relating to magnetic based recognition patterns and methods can also be applied for other identifiable materials, such as radio frequency relevant materials. In some embodiments, a first coded fiber with a radio frequency identification tag ("RFIDT") includes a first carbon fiber, and a first RFIDT connected to the first carbon fiber. In some embodiments, a second RFIDT fiber includes a second carbon fiber; and a second RFIDT connected to the second carbon fiber. In some embodiments, the first RFIDT and second RFIDT are arranged as a recognition pattern. In some embodiments, about 3, 5, 10, 100, 1000, or more coded fibers are each connected to an RFIDT, and the collection of RFIDT's arranged as a recognition pattern. In some embodiments, an RFID tag is embedded in calcified resin. In some embodiments, the RFID is embedded in such a way that its location can be recognized even after it is embedded.

Additional Alternative Embodiments

While the term "magnetic material" is used throughout the specification, this is for convenience only, and the teachings in regard to "magnetic materials" also apply to other identifiable materials (such as radio frequency readable materials, radiation, etc.)

In some embodiments, the recognition pattern can be used to address issues of recycling that can occur because CFRP is typically hard to recycle.

In some embodiments, it can be advantageous to mark CFRP components with a code in which information relating to the manufacturing history, intended use, manufacturer, or client user etc. can be recognized. In some embodiments, embedded recognition patterns are advantageous compared to externally pasted marking like labels, for which it can difficult to prevent fraud such as forgery or replacement. For example, when embedding an RFID chip, it can be difficult to locate its whereabouts if it is a proximity type RFID chip. For example, in the case of a far-field type RFID chip, a vehicle can have too many components to discern from which component the signal originates. In some embodiments it is to mark such information in the material itself in a manner that is difficult to fabricate or interfere with afterward. As is relevant to some embodiments, prior to the disclosure herein, a satisfactory marking method that had no effect on the material properties and that meets acceptable standards in terms of cost had not yet been developed.

In some embodiments—for example in an epoxy resin type carbon fiber reinforced polymer ("CFRP"), in which carbon fiber fabrics are stacked in layers—a method of embedding a code at the time of producing the carbon fiber fabric, by forming a 1-, 2-, and/or 3-dimensional pattern made of ferromagnetic material in the fabric using fibers that are partially plated with ferromagnetic material such as nickel or partially using fibers that are entirely plated with ferromagnetic material such as nickel, to make it function as a recognition pattern is provided. In some embodiments, a system deciphers this recognition pattern by using a magnetic antenna such as a giant magnetoresistance sensors or tunneling magnetoresistance ("TMR") component to reproduce the recognition pattern.

In some embodiments, the signature of the recognition pattern can be used to access a uniquely derived information database where more detailed information can be obtained. By way of example, the mainstream CFRP used for applications requiring particularly high-strength can be prepared by layering 2-dimensional carbon fiber fabrics oriented at different angles in a stack, impregnating them with epoxy resin, followed by hardening. However, such a mainstream CRFP can be extremely difficult to recycle compared with CFRP prepared by dispersing chopped fibers in thermoplastic resin.

In some embodiments, any of the above noted methods can be used to place a marking (such as a recognition pattern) inside a composite material.

In some embodiments, a recognition pattern is embedded into the material to be hardened so that the recognition pattern cannot be modified afterward, thus ensuring a highly reliable recognition pattern. In some embodiments, only a small amount of magnetic carbon fibers generate a recognition pattern. In some embodiments, magnetically coated carbon fibers have capabilities and a cost level similar to normal carbon fibers and have little effect on the material properties and its cost.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer can opt for a mainly hardware and/or firmware vehicle; if flexibility is paramount, the implementer can opt for a mainly software implementation; or, yet again alternatively, the implementer can opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system can be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

EXAMPLE 1

Informationally-Coded Carbon Fiber Fender

In this example, a fender for a hybrid-electric automobile includes an informationlly-encoded carbon fiber. To manufacture the fender, carbon nanotubes are woven into a fabric. One hundred layers of carbon fiber are woven. In one layer of fabric, at four locations, each in a different quadrant of the fabric, magnetic fiber structures are employed. The magnetic fiber structures contain magnetic carbon fibers of carbon nanotubes which are coated in nickel. In each of the four locations, 1,000 magnetic carbon fibers and 1,200 non-magnetic carbon fibers are arranged in an alternating pattern in the warp of a carbon fabric to form a one-dimensional recognition pattern, as in FIG. 1C. The layer of carbon fabric that contains these magnetic fibers is sandwiched between layers of non-magnetic carbon fabric, so that the layers are oriented in different directions. The layers of carbon fabric are impregnated with epoxy, hardened to the B state. Using vacuum molding, the layers are molded to form a fender. The fender can be installed onto a car.

An giant magnetoresistance sensor configured to resolve a ferromagnetic material within 0.1 mm, and connected to an electronic database, scans the fender and detects the signature of the recognition pattern. A digital representation of each signature of the recognition pattern is stored in the electronic database, along with information on the manufacturer of the fender, the manufacture date, the manufacturing method, and the types of carbon fibers, carbon fabric, and epoxy used.

The fender is used in a hybrid-electric automobile.

When the hybrid-electric automobile is retired from service, the fender is scanned with a giant magnetoresistance sensor configured to resolve a ferromagnetic material within 0.1 mm, and connected to a computer programmed to read a computer-readable medium containing a database. The sensor detects the signature of the recognition pattern of the fender, and transmits data describing that signature to a computer. The computer is configured to compare the recognition pattern transmitted by the sensor to recognition patterns stored in the database. The computer compares the recognition pattern transmitted by the sensor to recognition patterns in the database, identifies a match, and retrieves data on the manufacturer of the fender, the manufacture date, the manufacturing method, and the types of carbon fibers, carbon fabric, and epoxy used. The fender is removed from the automobile. Based on the information retrieved from the database, the fender is recycled using an appropriate recycling method for the age, manufacturing process, and types of materials used to manufacture the fender.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A coded fiber comprising:
    a first magnetic carbon fiber comprising:
        a first carbon fiber; and
        at least a partial first coating of a ferromagnetic material on a surface of the first carbon fiber, wherein the first coating of ferromagnetic material provides at least a portion of a recognition pattern.

2. The coded fiber of claim 1, further comprising a second magnetic carbon fiber that comprises a second carbon fiber that is at least partially coated by the first coating of ferromagnetic material.

3. The coded fiber of claim 2, wherein the first magnetic carbon fiber and the second magnetic carbon fiber are arranged in substantially the same plane.

4. The coded fiber of claim 1 further comprising a second magnetic carbon fiber, wherein the second magnetic carbon fiber comprises:
    a second carbon fiber; and
    at least a partial second coating of a ferromagnetic material on a surface of the second carbon fiber.

5. The coded fiber of claim 4 further comprising:
    at least one background carbon fiber, wherein the background carbon fiber provides at least a further portion of the recognition pattern.

6. The coded fiber of claim 5, wherein the recognition pattern comprises a two-dimensional pattern of ferromagnetic material.

7. The coded fiber of claim 1, wherein the first carbon fiber is at least partially embedded in a polymer.

8. The coded fiber of claim 1, wherein the first carbon fiber comprises a carbon nanotube.

9. The coded fiber of claim 1, wherein the first magnetic carbon fiber is part of a weave of carbon fibers.

10. The coded fiber of claim 1, comprising:
    a first plane of carbon fiber polymers comprising the first magnetic carbon fiber; and
    a second plane of carbon fiber polymers comprising at least a second magnetic carbon fiber.

11. An informationally-encoded carbon fiber structure, the structure comprising:
    a first magnetic carbon fiber comprising:
        a first carbon fiber; and
        at least a partial coating of a ferromagnetic material on a surface of the first carbon fiber; and
    at least one background carbon fiber, wherein the first magnetic carbon fiber is arranged in a recognition pattern with the at least one background carbon fiber; and
    a carbon fiber reinforced polymer, upon which the first magnetic carbon fiber and the at least one background carbon fiber are located.

12. The structure of claim 11, further comprising a second magnetic carbon fiber, wherein the first magnetic carbon fiber and the second magnetic carbon fiber are arranged in a parallel orientation on substantially the same plane.

13. The structure of claim 11, wherein the first and second magnetic carbon fibers are arranged to form a woven fabric.

14. The structure of claim 11, wherein the carbon fiber reinforced polymer comprises at least one of: an epoxy, a polyester, a vinyl ester, or a nylon.

15. A method of manufacturing a coded fiber, the method comprising:
    providing a first magnetic carbon fiber comprising:
        a first carbon fiber; and
        at least a partial coating of a ferromagnetic material on a surface of the first carbon fiber; and
    positioning the coating of a ferromagnetic material in a recognition pattern, thereby manufacturing a coded fiber.

16. The method of claim 15, further comprising positioning at least one background carbon fiber in proximity to the first carbon fiber, wherein the background carbon fiber provides at least a part of the recognition pattern.

17. The method of claim 16, wherein the at least a partial coating of a ferromagnetic material is applied to the surface of the first carbon fiber prior to positioning.

18. A method of reading a ferromagnetic material, the method comprising:
    providing at least a first magnetic carbon fiber comprising:
        a first carbon fiber; and
        at least a partial coating of a ferromagnetic material on a surface of the first carbon fiber, wherein the coating comprises a recognition pattern; and
    detecting the recognition pattern generated by the ferromagnetic material.

19. The method of claim 18 wherein detecting the pattern is achieved by an electromagnetic detection device that is configured to resolve a ferromagnetic material within 1 mm.

20. The method of claim 18 further comprising accessing a database and comparing the recognition pattern generated by the ferromagnetic material to an electronic representation of the recognition pattern, which is in the database.

21. The method of claim 18 wherein the first magnetic carbon fiber is located on or in a carbon fiber reinforced polymer material.

22. The method of claim 21, wherein the recognition pattern denotes how the material is to be recycled.

23. The method of claim 22 further comprising processing the material based upon the recognition pattern that is detected.

24. A kit comprising:
    at least one magnetic carbon fiber comprising:
        a first carbon fiber; and
        at least a partial coating of a ferromagnetic material on a surface of the first carbon fiber, wherein the coating of ferromagnetic material provides a recognition pattern; and
    an electromagnetic sensor configured to detect the recognition pattern.

25. The kit of claim 24 further comprising a computer readable medium that is operationally connected to the electromagnetic sensor, wherein the computer readable medium comprises a database comprising informational content regarding one or more recognition patterns.

26. A coded fiber comprising:
 a first radio frequency identification tag ("RFIDT") fiber comprising:
  a first carbon fiber; and
  a first RFIDT connected to the first carbon fiber;
 a second radio frequency identification tag ("RFIDT") fiber comprising:
  a second carbon fiber; and
  a second RFIDT connected to the second carbon fiber, wherein the first RFIDT and second RFIDT are arranged as a recognition pattern.

\* \* \* \* \*

UNITED STATES PATENT AND TRADEMARK OFFICE
CERTIFICATE OF CORRECTION

| | | |
|---|---|---|
| PATENT NO. | : 8,851,384 B2 | Page 1 of 3 |
| APPLICATION NO. | : 13/514012 | |
| DATED | : October 7, 2014 | |
| INVENTOR(S) | : Iwamoto | |

It is certified that error appears in the above-identified patent and that said Letters Patent is hereby corrected as shown below:

In the Drawings

In Fig. 2A, Sheet 4 of 5, for Tag "100", in Line 3, delete "coataing" and insert -- coating --, as shown on the attached, therefor.

In Fig. 2B, Sheet 5 of 5, for Tag "200", in Line 3, delete "coataing" and insert -- coating --, as shown on the attached, therefor.

In the Specification

In Column 8, Lines 63-64, delete "indentifiable" and insert -- identifiable --, therefor.

In Column 16, Line 2, delete "and or" and insert -- and/or --, therefor.

In Column 16, Line 67, delete "informationlly" and insert -- informationally --, therefor.

Signed and Sealed this
Seventh Day of April, 2015

Michelle K. Lee
*Director of the United States Patent and Trademark Office*